United States Patent
Andre et al.

(10) Patent No.: US 10,013,171 B2
(45) Date of Patent: Jul. 3, 2018

(54) REDUCING STRESS ON RAIDS UNDER REBUILD

(71) Applicant: International Business Machines Corporation, Armonk, NY (US)

(72) Inventors: Herve G. P. Andre, Orlando, FL (US); Rashmi Chandra, San Jose, CA (US); Glynis G. Dsouza, Tucson, AZ (US); Larry Juarez, Tucson, AZ (US); Tony Leung, Tucson, AZ (US); Igor Popov, Tucson, AZ (US); Jacob L. Sheppard, Queen Creek, AZ (US); Todd C. Sorenson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/754,576

(22) Filed: Jun. 29, 2015

(65) Prior Publication Data

US 2016/0378339 A1  Dec. 29, 2016

(51) Int. Cl.
 G06F 3/06 (2006.01)

(52) U.S. Cl.
 CPC ............ G06F 3/061 (2013.01); G06F 3/0647 (2013.01); G06F 3/0659 (2013.01); G06F 3/0689 (2013.01)

(58) Field of Classification Search
 CPC .......... G06F 3/06; G06F 3/061; G06F 3/0689; G06F 3/0647; G06F 3/0659
 See application file for complete search history.

(56) References Cited

U.S. PATENT DOCUMENTS

| | | | |
|---|---|---|---|
| 7,024,586 B2 | 4/2006 | Kleiman et al. | |
| 7,185,222 B2 | 2/2007 | Burton et al. | |
| 7,802,063 B1 | 9/2010 | Chatterjee et al. | |
| 8,041,991 B2 | 10/2011 | McKean | |
| 2002/0016827 A1* | 2/2002 | McCabe | G06F 11/2058 709/213 |
| 2010/0079885 A1* | 4/2010 | McKean | G06F 11/1662 360/15 |
| 2014/0136887 A1* | 5/2014 | Murakami | G06F 11/2082 714/6.32 |
| 2015/0046668 A1 | 2/2015 | Hyde, II et al. | |
| 2015/0169409 A1* | 6/2015 | Cho | G06F 11/1088 714/764 |
| 2015/0269025 A1* | 9/2015 | Krishnamurthy | G06F 11/1092 714/6.24 |
| 2016/0147620 A1* | 5/2016 | Lesartre | G06F 11/1666 714/6.3 |

* cited by examiner

*Primary Examiner* — David X Yi
*Assistant Examiner* — Zubair Ahmed
(74) *Attorney, Agent, or Firm* — Nelson and Nelson; Daniel P. Nelson; Alexis V. Nelson (57) ABSTRACT

A method for reducing stress on a RAID under rebuild is disclosed herein. In one embodiment, such a method includes performing the following actions while the RAID is undergoing a rebuild process: (1) redirect writes intended for the RAID to a temporary storage area located on a same primary storage system as the RAID, and (2) redirect reads intended for the RAID to a secondary storage system configured to store a copy of data in the RAID. The method is further configured to perform the following actions upon completing the rebuild process: (3) update the rebuilt RAID to reflect writes made to the temporary storage area during the rebuild process, and (4) redirect reads and writes to the rebuilt RAID. A corresponding system and computer program product are also disclosed.

17 Claims, 7 Drawing Sheets

REDUCING STRESS ON RAIDS UNDER REBUILD

BACKGROUND

Field of the Invention

This invention relates to systems and methods for reducing stress on RAIDS undergoing a rebuild process.

Background of the Invention

A RAID (i.e., a Redundant Array of Independent Disks) is a storage technology that provides increased storage functions and reliability through redundancy. A RAID is created by combining multiple disk-drive components (or other storage components such as solid state drives) into a logical unit. Data is then distributed across the drives using various techniques, referred to as "RAID levels." The standard RAID levels, which currently include RAID levels 1 through 6, are a basic set of RAID configurations that employ striping, mirroring, and/or parity to provide data redundancy. Each of the configurations provides a balance between two key goals: (1) increasing data reliability and (2) increasing I/O performance.

When a disk-drive component of a RAID fails, the RAID may be rebuilt to restore data redundancy. This may be accomplished by replacing the failed disk-drive component with a standby disk-drive component and copying and/or regenerating the lost data on the standby disk-drive component. Ideally, the RAID will be rebuilt as expeditiously as possible to minimize the possibility that another disk-drive component will fail and result in permanent data loss.

Unfortunately, when a RAID is being rebuilt due to a disk failure, additional stress is typically placed on the RAID that may cause other disk drives in the RAID to fail. This may be at least partially due to the fact that I/O may still be occurring on the RAID while it is being rebuilt. This may also be due to the fact that disk drives in a RAID may be of similar age, brand, size, etc., and when one disk drive fails, other disk drives may be on the verge of failing. The additional stress placed on the RAID during the rebuild process may be enough to induce these already-weakened drives to fail. Unfortunately, if another disk drive fails before the RAID has had a chance to rebuild, permanent data loss may occur.

In view of the foregoing, what are needed are systems and methods to reduce stress on RAIDs undergoing a rebuild process. Ideally, such systems and methods will avoid permanent data loss as well as improve I/O performance.

SUMMARY

The invention has been developed in response to the present state of the art and, in particular, in response to the problems and needs in the art that have not yet been fully solved by currently available systems and methods. Accordingly, the invention has been developed to provide improved systems and methods to reduce stress on RAIDs under rebuild. The features and advantages of the invention will become more fully apparent from the following description and appended claims, or may be learned by practice of the invention as set forth hereinafter.

Consistent with the foregoing, a method for reducing stress on a RAID under rebuild is disclosed herein. In one embodiment, such a method includes performing the following actions while the RAID is undergoing a rebuild process: (1) redirect writes intended for the RAID to a temporary storage area located on a same primary storage system as the RAID, and (2) redirect reads intended for the RAID to a secondary storage system configured to store a copy of data in the RAID. The method is further configured to perform the following actions upon completing the rebuild process: (3) update the rebuilt RAID to reflect writes made to the temporary storage area during the rebuild process, and (4) redirect reads and writes to the rebuilt RAID. A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 1:
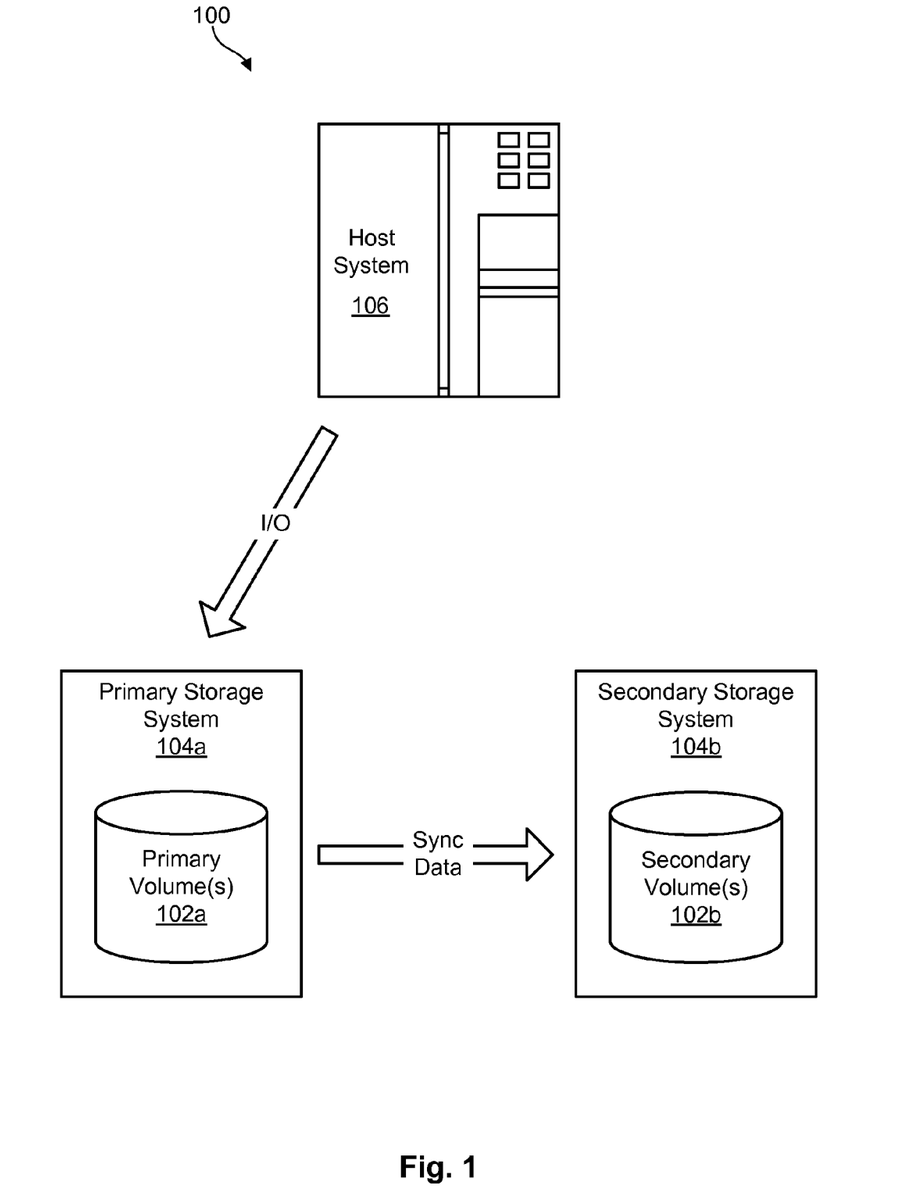
FIG. 1 is a high-level block diagram showing one example of a Peer-to-Peer-Remote-Copy ("PPRC") environment.

Referring to FIG. 1, one example of a data replication system 100, in this embodiment a PPRC system 100, is illustrated. The PPRC system 100 is presented to show an example of an architecture in which embodiments of the invention might operate, and is not intended to be limiting. In general, the PPRC system 100 establishes a mirroring relationship between one or more primary volumes 102a and one or more secondary volumes 102b. Once this relationship is established, a consistent copy of data is maintained on the volumes 102a, 102b. The primary and secondary volumes 102a, 102b may be located on the same storage system 104, although the volumes 102a, 102b are typically located on separate storage systems 104a, 104b located some distance (e.g., several miles to thousands of miles) from one another. Channel extension equipment may be located between the storage systems 104a, 104b, as needed, to extend the distance over which the storage systems 104a, 104b may communicate.

The PPRC system 100 may, in certain embodiments, be configured to operate in either a synchronous or asynchronous manner. When operating synchronously, an I/O may only be considered complete when it has completed successfully on both the primary and secondary storage systems 104a, 104b. As an example, in such a configuration, a host system 106 may initially send a write request to the primary storage system 104a. This write operation may be performed on the primary storage system 104a. The primary storage system 104a may, in turn, transmit a write request to the secondary storage system 104b. The secondary storage system 104b may execute the write operation and return a write acknowledge signal to the primary storage system 104a. Once the write has been performed on both the primary and secondary storage systems 104a, 104b, the primary storage system 104a returns a write acknowledge signal to the host system 106. The I/O is considered complete when the host 106 receives the write acknowledge signal.

By contrast, asynchronous operation may only require that the write complete on the primary storage system 104a before the write is considered complete. That is, a write acknowledgement may be returned to the host system 106 when the write has completed on the primary storage system 104a, without requiring that the write be completed on the secondary storage system 104b. The write may then be mirrored to the secondary storage system 104b as time and resources allow to create a consistent copy on the secondary storage system 104b.

In the event the primary storage system 104a fails, I/O may be redirected to the secondary storage system 104b to enable continuous operations. This process may be referred to as a swap or HyperSwap. Since the secondary storage system 104b contains a consistent copy of the data on the primary storage system 104a, the redirected I/O (e.g., reads and writes) may be performed on the copy of the data on the secondary storage system 104b. When the primary storage system 104a is repaired or resumes operation, I/O may be redirected to the primary storage system 104a.

Although the systems and methods disclosed herein will be discussed primarily in association with PPRC systems, the systems and methods may also be applicable, in various forms, to other analogous data replication technologies, regardless of the manufacturer, product name, or components or component names associated with the technology. Any data replication technology that could benefit from one or more embodiments of the invention is, therefore, deemed to fall within the scope of the invention.

Figure 2:
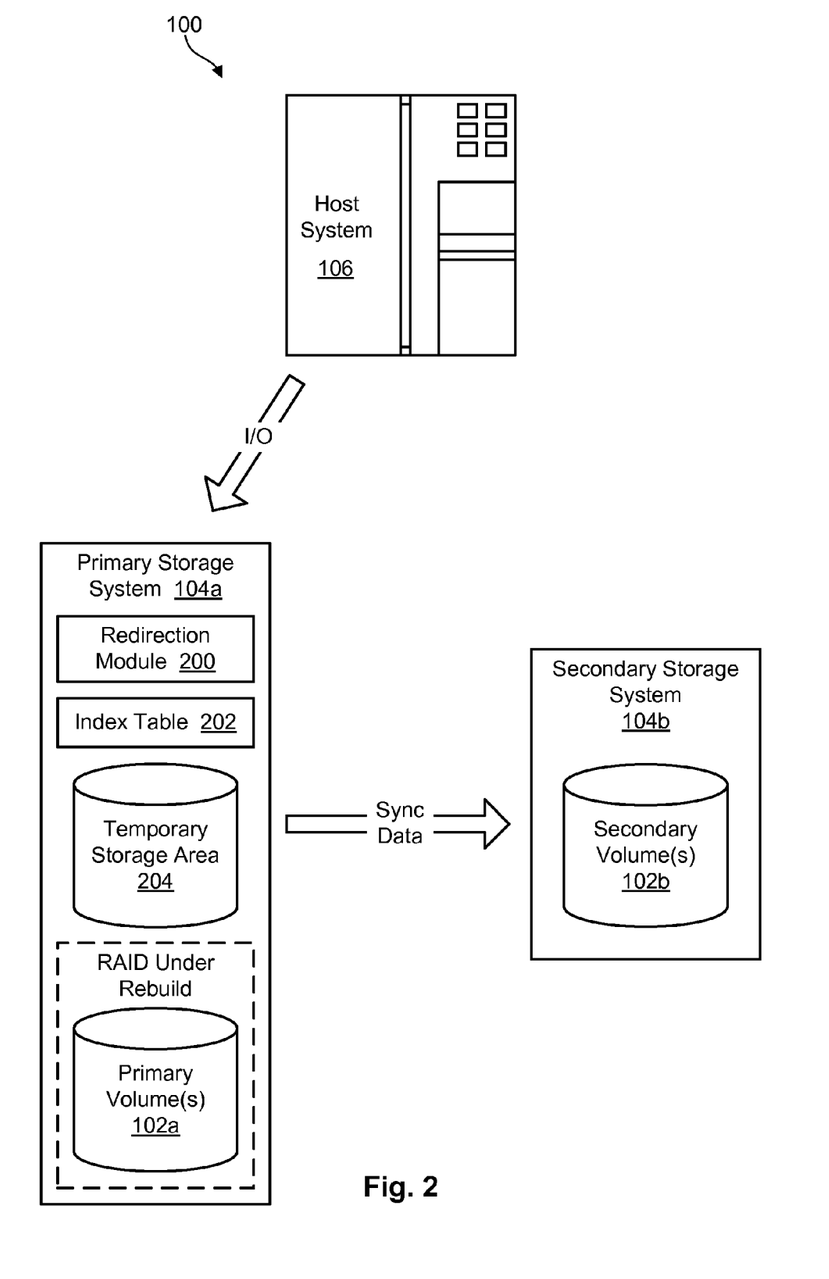
FIG. 2 is a high-level block diagram showing systems and methods for reducing stress on a RAID undergoing a rebuild process in the PPRC environment.

Referring to FIG. 2, in certain embodiments, one or more of the primary volumes 102a may be implemented as a RAID (i.e., a Redundant Array of Independent Disks) to improve I/O performance and and/or reliability. When a disk-drive component of a RAID fails, the primary storage system 104a may initiate a RAID rebuild process to restore data redundancy and/or I/O performance associated with the RAID. This may be accomplished by replacing the failed disk-drive component with a standby disk-drive component and copying and/or regenerating the lost data on the standby disk-drive component. Unfortunately, when a RAID is being rebuilt due to a disk failure, additional stress may be placed on the RAID that may cause other disk drives in the RAID to fail. If another disk drive fails before the RAID has had a chance to rebuild, permanent data loss may occur (depending on the RAID level).

In certain embodiments in accordance with the invention, a redirection module 200 may be provided in the primary storage system 104a to detect when a RAID 102a enters a rebuilding state and redirect I/O to reduce stress on the RAID 102a. Ideally, this will reduce the chance that another disk drive will fail before that RAID has had a chance to rebuild. The redirection module 200 may, in certain embodiments, be implemented entirely within the primary storage system 104a in a way that is transparent to a host system 106. Thus, the host 106 may, in certain embodiments, by unaware that a RAID of the primary storage system 104a has entered a rebuilding state and/or that I/O is being redirected away from the RAID 102a.

In order to redirect I/O, the redirection module 200 may utilize one or more of an index table 202 and a temporary storage area 204. The temporary storage area 204 (e.g., a user-configurable pool of extents) may be established to store writes intended for RAIDs 102a that are undergoing a rebuild process. In certain embodiments, the size of the temporary storage area 204 may be user-configurable, such as using a command line interface (CLI) or graphical user interface (GUI).

The index table 202 may be used to record which storage areas (e.g., tracks) of a RAID 102a have been written to the temporary storage area 204 during the rebuild process. As will be explained in more detail hereafter, after the RAID has been rebuilt, the rebuilt RAID 102a may be updated to reflect writes to the temporary storage area 204 during the rebuild process. This will ensure that the data in the rebuilt RAID 102a is consistent with the data in the secondary volumes 102b. The index table 202 may be used to keep track of which data has been transferred from the temporary storage area 204 to the rebuilt RAID 102a.

Figure 3:
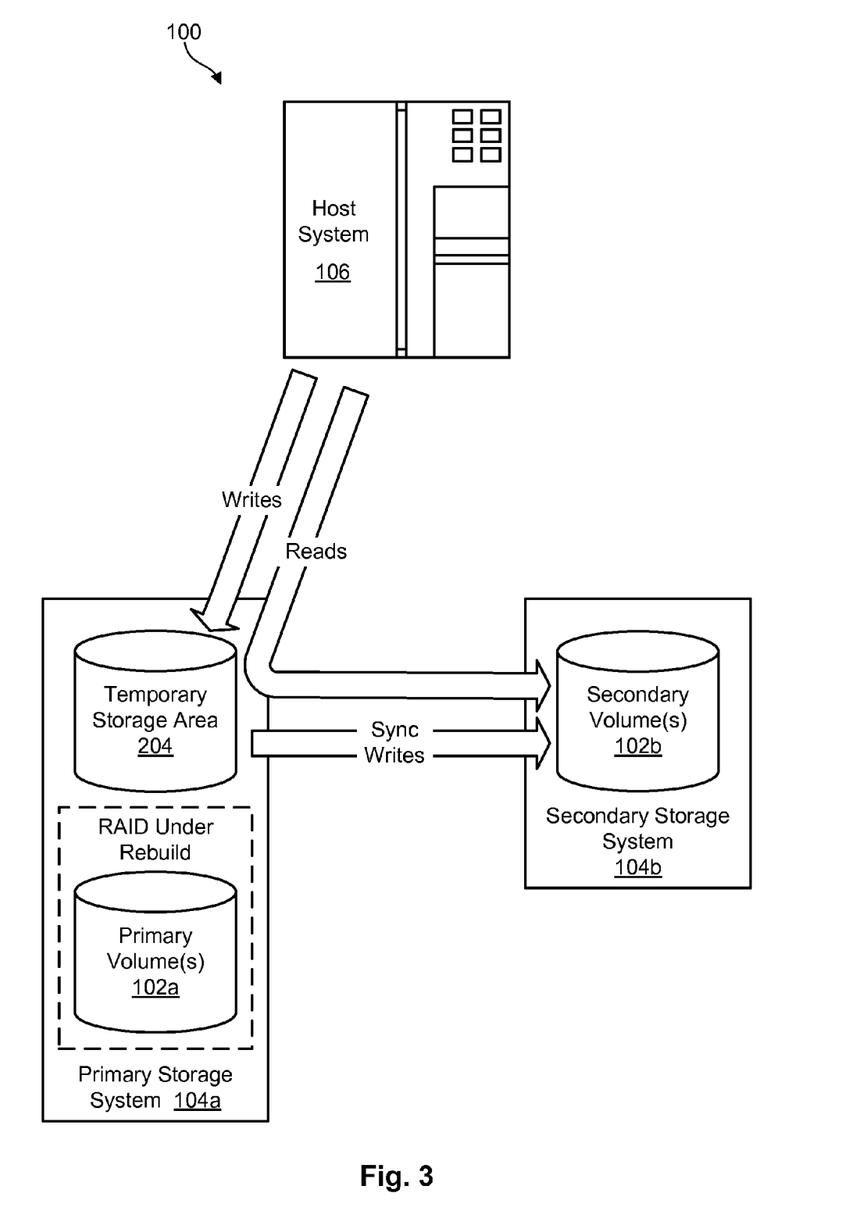
FIG. 3 is a high-level block diagram showing how reads and writes are redirected while the RAID is undergoing the rebuild process.

Referring to FIG. 3, while continuing to refer generally to FIG. 2, when a RAID 102a is in a rebuilding state, writes to the RAID 102a (primary volumes 102a) are stored in the temporary storage area 204. These writes may be mirrored to the secondary volumes 102b that are in a mirroring relationship with the RAID 102a. If the temporary storage area 204 has run out of space when a write request is received, data may be written to the RAID 102a under rebuild in the conventional manner and mirrored to the secondary volumes 102b.

Read requests, by contrast, may be redirected to the secondary volumes 102b during the rebuild process. In certain embodiments, all reads are directed to the secondary volumes 102b. In other embodiments, certain reads may be directed to the temporary storage area 204 if the requested data is contained therein (thereby improving I/O performance), while all other reads are directed to the secondary volumes 102b. The index table 202 may be used to determine whether the requested data is in the temporary storage area 204 or needs to be retrieved from the secondary volumes 102b.

Figure 4:
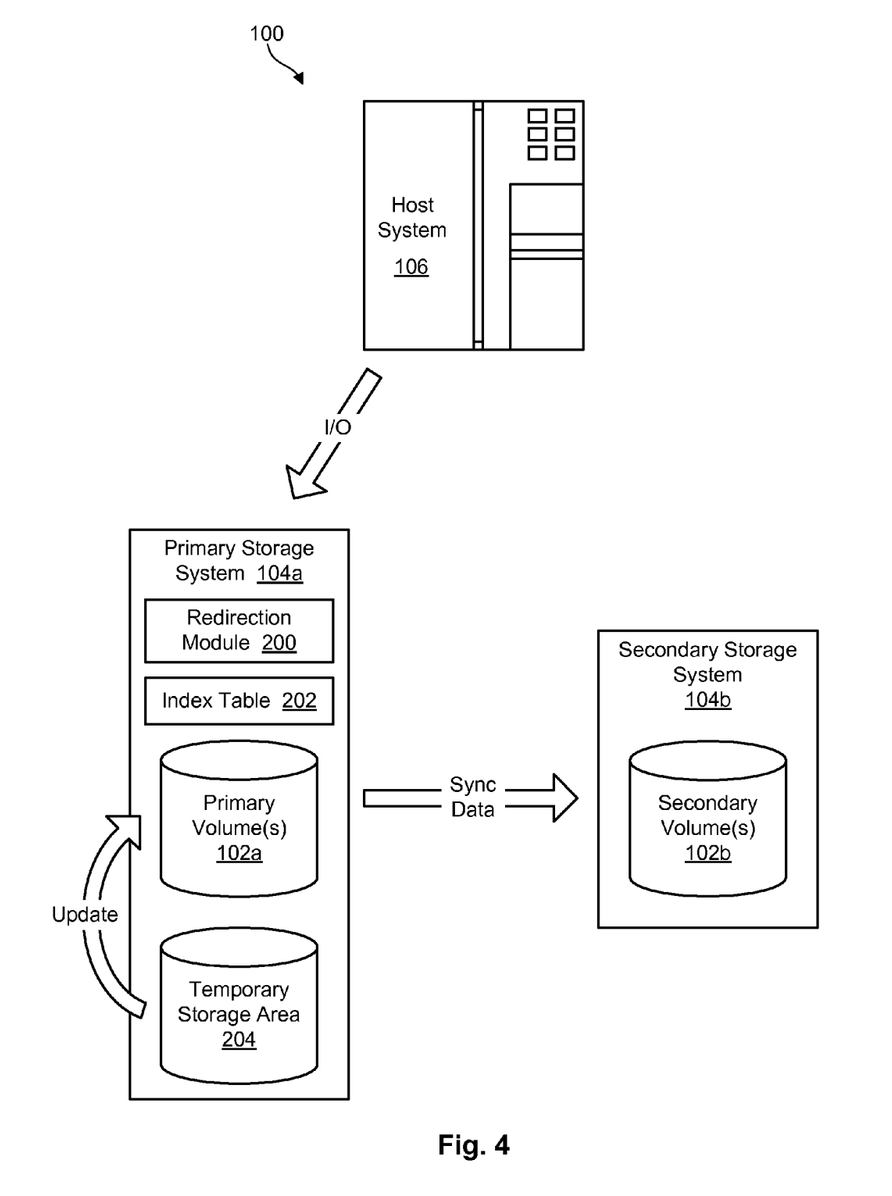
FIG. 4 is a high-level block diagram showing how the rebuilt RAID is updated to reflect writes made to a temporary storage area during the rebuild process.

Referring to FIG. 4, after the rebuild process is complete, data that was written to the temporary storage area 204 during the rebuild process may be used to update the rebuilt RAID 102a. This will ensure that the data in the rebuilt RAID 102a is consistent with the data in the secondary volumes 102b. While these updates are occurring, any write requests that are received for the RAID 102a may be directed to the rebuilt RAID 102a. What data is written to the rebuilt RAID 102a, the index table 202 may be updated to indicate that any corresponding data in the temporary storage area 204 is stale and may be discarded.

By contrast, when a read request is received while the rebuilt RAID 102a is being updated with data from the temporary storage area 204, the redirection module 200 may first check whether the requested data is stored in the temporary storage area 204. If the requested data is stored in the temporary storage area 204, the redirection module 200 may direct the read request to the temporary storage area 204 (since this may be the most current version of the data). Otherwise, the redirection module 200 may direct the read request to the rebuilt RAID 102a. This will ensure that the latest version of the data is read. After the rebuilt RAID 102a has been updated with all of the data in the temporary storage area 204, the redirection module 200 may redirect all read and write requests to the rebuilt RAID 102a as occurred prior to the rebuild process.

Figure 5:
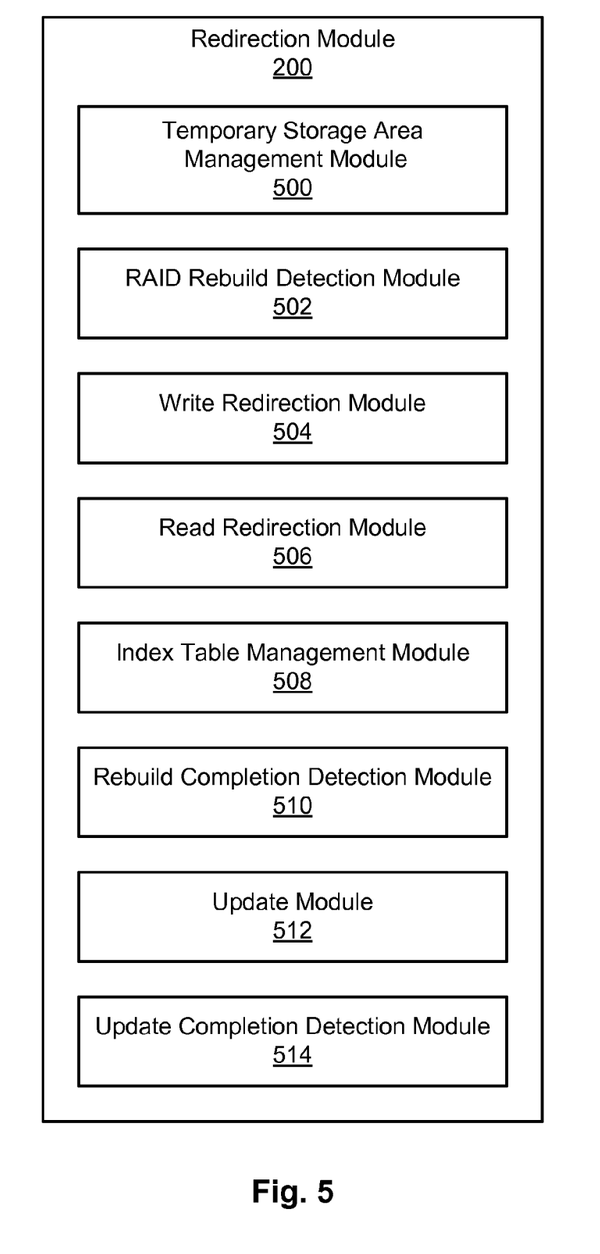
FIG. 5 is a high-level block diagram showing various sub-modules within the redirection module.

Referring to FIG. 5, the redirection module 200 previously discussed may include one or more sub-modules to perform various features and functions. These modules may be implemented in hardware, software, firmware, or a combination thereof. The sub-modules may include one or more of a temporary storage area management module 500, RAID rebuild detection module 502, write redirection module 504, read redirection module 506, index table management module 508, rebuild completion detection module 510, update module 512, and update completion detection module 514.

The temporary storage area management module 500 may be configured to manage the temporary storage area 204 previously discussed. For example, the temporary storage area management module 500 may enable a user to establish a temporary storage area 204 to store data while RAIDs 102a are in a rebuilding state, and/or set the size of the temporary storage area 204. In certain embodiments, the temporary storage area 204 may be configured by way of a CLI or GUI as previously discussed.

The RAID rebuild detection module 502 may detect when a RAID 102a is being rebuilt or is about to enter a rebuilding state. This may enable the redirection module 200, and more particularly the write redirection module 504 and read redirection module 506, to take actions to reduce stress on the RAID 102a. For example, the write redirection module 504 may redirect writes to the temporary storage area 204, as previously discussed. The read redirection module 506, by contrast, may direct reads to the secondary volumes 102b and/or the temporary storage area 204. This will allow the RAID 102a to rebuild itself without having to service external I/O requests.

The index table management module 508 may manage the index table 202 previously discussed. When writes are made to the temporary storage area 204, the index table management module 508 may update the index table 202 to indicate where the data was written (e.g., which track it was written to, etc.), a timestamp associated with the data, and the like. Similarly, when writes are transferred from the temporary storage area 204 to the rebuilt RAID 102a after the rebuild process is complete, the index table management module 508 may update the index table 202 to indicate such. Similarly, when writes are made to the rebuilt RAID 102a for data that is also stored in the temporary storage area 204, the index table management module 508 may update the index table 202 to indicate that the data in the temporary storage area 204 is stale and may be discarded.

The rebuild completion detection module 510 may detect when a RAID 102a has completed the rebuild process. This may enable I/O to be redirected. For example, after the rebuild process has completed, the write redirection module 504 may direct write requests to the rebuilt RAID 102a. The read redirection module 506, by contrast, may direct read requests to the temporary storage area 204 if the most current version of the data is contained therein. Otherwise, the read redirection module 506 may direct read requests to the rebuilt RAID 102a.

Once the RAID 102a has been rebuilt, the update module 512 may update the rebuilt RAID 102a with writes stored in the temporary storage area 204. The update completion detection module 514 may detect when this update processed has completed. Once the update process has completed, the write redirection module 504 and read redirection module 506 may direct all read and write requests to the rebuilt RAID 102a, as occurred prior to the rebuild process.

Figure 6:
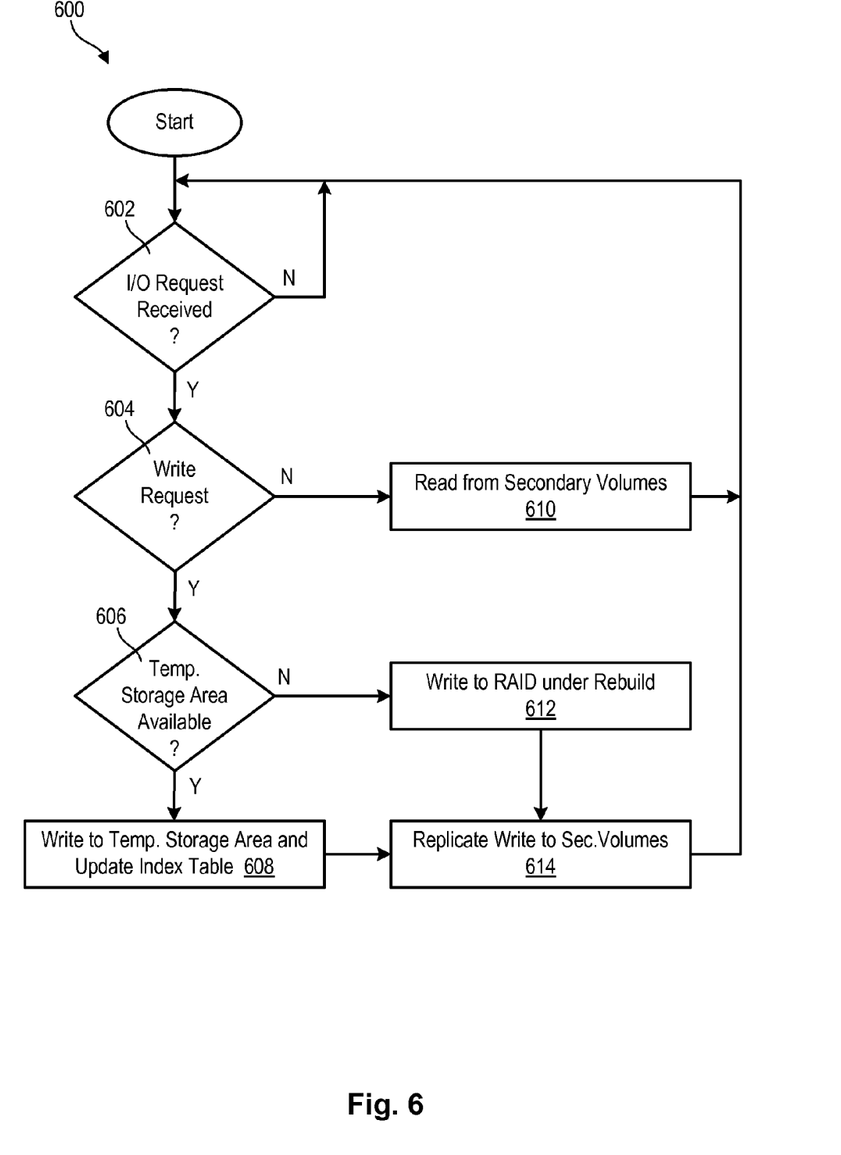
FIG. 6 is a process flow diagram showing one embodiment of a method for processing I/O requests during a RAID rebuild process.

Referring to FIG. 6, one embodiment of a method 600 for processing I/O requests when a RAID 102a is in a rebuilding state is illustrated. Such a method 600 may be executed by the primary storage system 104a. As shown, the method 600 initially determines 602 whether an I/O request has been received. If an I/O request has been received, the method 600 determines 604 whether the I/O request is a write request. If the I/O request is not a write request (indicating that it is a read request), the method 600 executes the read request by reading 610 from the secondary volumes 102b. The method 600 then repeats by waiting for the next I/O request.

If, on the other hand, the I/O request is a write request, the method 600 determines 606 whether the temporary storage area 204 is available. This may include determining whether a temporary storage area 204 has been established and/or whether space is available in the temporary storage area 204 for writing data. If a temporary storage area 204 has been established and space is available therein, the method 600 writes 608 to the temporary storage area 204 and updates 608 the index table 202 to indicate that the associated storage area (e.g., track) has been written to. If space is not available, the method 600 simply writes 612 to the RAID 102a under rebuild. Although this will place additional stress on the RAID 102a during the rebuild process, it will ensure that the write will complete successfully. Once the write is completed to the temporary storage area 204 or the RAID 102a under rebuild, the write is replicated 614 to the secondary volumes 102b. The method 600 then repeats by waiting for the next I/O request.

Figure 7:
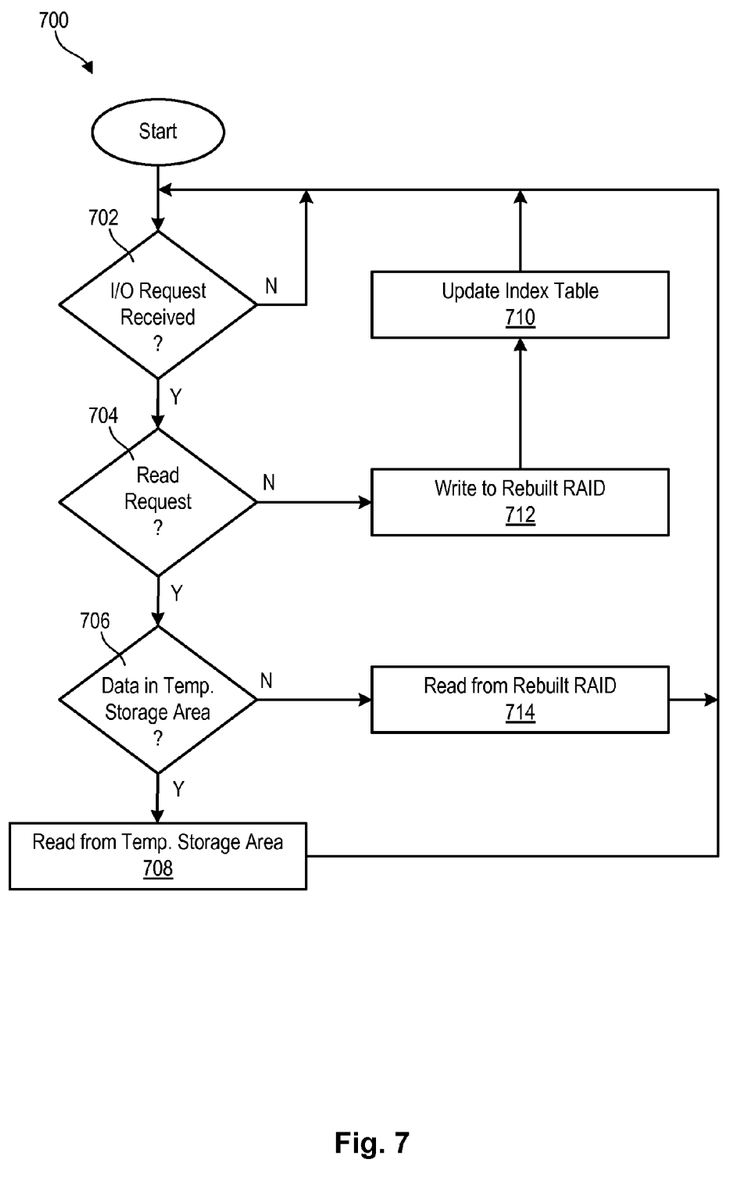
FIG. 7 is a process flow diagram showing one embodiment of a method for processing I/O requests while the rebuilt RAID is being updated to reflect writes made to the temporary storage area during the rebuild process.

Referring to FIG. 7, one embodiment of a method 700 for processing I/O requests while a rebuilt RAID 102a is being updated with data from a temporary storage area 204 is illustrated. Such a method 700 may also be executed by the primary storage system 104a. As shown, the method 700 initially determines 702 whether an I/O request has been received. If an I/O request has been received, the method 700 determines 704 whether the I/O request is a read request. If the I/O request is not a read request (indicating that it is a write request), the method 700 executes the write request by writing 712 to the rebuilt RAID 102a. If the data written to the rebuilt RAID 102a is also contained in the temporary storage area 204, the method 700 updates 710 the index table 202 to indicate that the data in the temporary storage area 204 is stale and may be discarded.

If, at step 704, the I/O request is a read request, the method 700 determines 706 whether the requested data is stored in the temporary storage area 204. If the data is stored in the temporary storage area 204, the method 700 reads 708 from the temporary storage area 204. If the data is not stored in the temporary storage area 204, the data is read 714 from the rebuilt RAID 102a. The method 700 then repeats by waiting for the next I/O request. This method 700 continues until the rebuilt RAID 102a is completely updated with data from the temporary storage area 204.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for reducing stress on a RAID under rebuild, the method comprising:

providing a peer-to-peer-remote-copy (PPRC) data replication system comprising a primary storage system and a secondary storage system configured to receive a replicated copy of data from the primary storage system;

implementing, on the primary storage system, a redundant array of independent disks (RAID);

while the RAID is undergoing a rebuild process, dividing I/O requests intended for the RAID between the primary storage system and secondary storage system as follows: (1) redirecting writes intended for the RAID to a temporary storage area located on the primary storage system, and mirroring the writes from the temporary storage area to the secondary storage system, and (2) redirecting reads intended for the RAID to the secondary storage system; and upon completing the rebuild process, (3) updating the rebuilt RAID to reflect writes made to the temporary storage area during the rebuild process, and (4) redirecting reads and writes to the rebuilt RAID.

2. The method of claim 1, further comprising keeping track of writes to the temporary storage area in an index table.

3. The method of claim 2, further comprising, upon receiving a read to the RAID, checking the index table to determine whether data associated with the read is contained in the temporary storage area.

4. The method of claim 3, further comprising performing the read to the temporary storage area if the index table indicates that the data is contained therein.

5. The method of claim 1, in the event space is not available in the temporary storage area, directing the writes to the RAID and replicating the writes to the secondary storage system.

6. The method of claim 1, while updating the rebuilt RAID, directing writes to the rebuilt RAID.

7. A computer program product for reducing stress on a RAID under rebuild, the computer program product comprising a computer-readable medium having computer-usable program code embodied therein, the computer-usable program code configured to:

implement a peer-to-peer-remote-copy (PPRC) data replication system comprising a primary storage system and a secondary storage system configured to receive a replicated copy of data from the primary storage system;

implement, on the primary storage system, a redundant array of independent disks (RAID);

while the RAID is undergoing a rebuild process, divide I/O requests intended for the RAID between the primary storage system and secondary storage system as follows: (1) redirect writes intended for the RAID to a temporary storage area located on the primary storage system, and mirroring the writes from the temporary storage area to the secondary storage system, and (2) redirect reads intended for the RAID to the secondary storage system; and perform the following upon completing the rebuild process: (3) update the rebuilt RAID to reflect writes made to the temporary storage area during the rebuild process, and (4) redirect reads and writes to the rebuilt RAID.

8. The computer program product of claim 7, wherein the computer-usable program code is further configured to keep track of writes to the temporary storage area in an index table.

9. The computer program product of claim 8, wherein the computer-usable program code is further configured to, upon receiving a read to the RAID, check the index table to determine whether data associated with the read is contained in the temporary storage area.

10. The computer program product of claim 9, wherein the computer-usable program code is further configured to perform the read to the temporary storage area if the index table indicates that the data is contained therein.

11. The computer program product of claim 7, wherein the computer-usable program code is further configured to, in the event space is not available in the temporary storage area, direct the writes to the RAID and replicate the writes to the secondary storage system.

12. The computer program product of claim 7, wherein the computer-usable program code is further configured to, while updating the rebuilt RAID, direct writes to the rebuilt RAID.

13. A system for reducing stress on a RAID undergoing a rebuild process, the system comprising:

a peer-to-peer-remote-copy (PPRC) data replication system comprising
a host system;
a primary storage system configured to process I/O requests received from the host system;
a secondary storage system located remotely from the primary storage system and configured to store a replicated copy of data stored on the primary storage system;
a redundant array of independent disks (RAID) on the primary storage system;
the PPRC data replication system configured to, while the RAID is undergoing a rebuild process, divide I/O requests intended for the RAID between the primary storage system and secondary storage system as follows: (1) redirect writes intended for the RAID to a temporary storage area located on the primary storage system, and mirror the writes from the temporary storage area to the secondary storage system, and (2) redirect reads intended for the RAID to the secondary storage system; and
the PPRC data replication system further configured to perform the following upon completing the rebuild process: (3) update the rebuilt RAID to reflect writes made to the temporary storage area during the rebuild process, and (4) redirect reads and writes to the rebuilt RAID.

14. The system of claim 13, wherein the PPRC data replication system is further configured to keep track of writes to the temporary storage area in an index table.

15. The system of claim 14, wherein the PPRC data replication system is further configured to, upon receiving a read to the RAID, check the index table to determine whether data associated with the read is contained in the temporary storage area.

16. The system of claim 15, wherein the PPRC data replication system is further configured to perform the read to the temporary storage area if the index table indicates that the data is contained therein.

17. The system of claim 13, wherein the PPRC data replication system is further configured to, in the event space is not available in the temporary storage area, direct the writes to the RAID and replicate the writes to the secondary storage system.

\* \* \* \* \*